Figure 1:
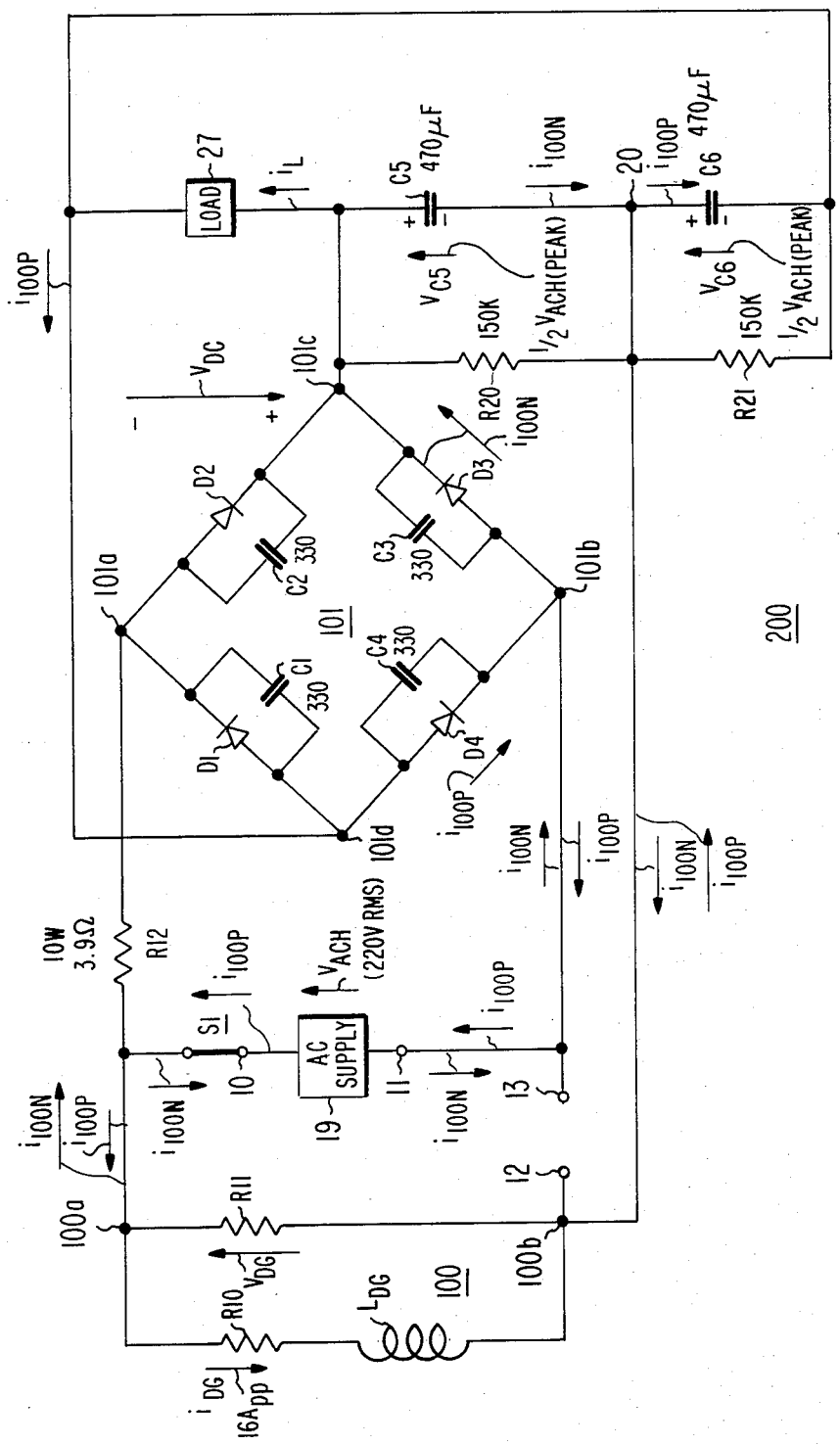

United States Patent [19]

Su et al.

[11] Patent Number: 4,626,981
[45] Date of Patent: Dec. 2, 1986

[54] DUAL VOLTAGE CONVERTER CIRCUIT

[75] Inventors: Robert Su, Taoyuan; Fang-Nung Leu, Tu-Chen Taipei, both of Taiwan

[73] Assignee: RCA Corporation, Princeton, N.J.

[21] Appl. No.: 761,847

[22] Filed: Aug. 2, 1985

[51] Int. Cl.$^4$ ............................................. H02M 3/06
[52] U.S. Cl. ..................................... 363/62; 363/126; 363/143; 361/150; 315/8
[58] Field of Search ................. 363/62, 125, 126, 142, 363/143; 358/190; 315/8; 361/150

[56] References Cited

U.S. PATENT DOCUMENTS 3,852,655 12/1974 Justice .................................. 363/143
4,215,392 7/1980 Rhoads ................................ 363/143

Primary Examiner—Patrick R. Salce
Assistant Examiner—Anita M. Ault
Attorney, Agent, or Firm—Eugene M. Whitacre; Joseph J. Laks; Sammy S. Henig

[57] ABSTRACT

A supply arrangement selectively operates from either one of dual AC mains supply voltages of, illustratively, 220 or 110 volt RMS AC. When the arrangement operates from the 220 volt AC mains supply voltage, a bridge rectifier, operating as a full-wave rectifier, charges each of series coupled first and second capacitors to one-half the peak of the AC mains supply voltage. During the positive half-period of the AC mains supply voltage, a positive voltage, equal to the difference between the instantaneous mains supply voltage and the DC voltage across the first capacitor is coupled between two terminals of a load such as a degaussing circuit. A corresponding negative difference voltage, is coupled between the two terminals during the other half-period. When the supply arrangement operates from the 110 volt AC mains supply voltage, the rectifier arrangement is reconfigured to permit the entire mains supply voltage to be coupled between two terminals of the load while enabling the bridge rectifier to operate as a voltage doubler.

19 Claims, 3 Drawing Figures

DUAL VOLTAGE CONVERTER CIRCUIT

The invention relates to a voltage converter for converting an alternating current (AC) input voltage to an AC output voltage of a predetermined amplitude that is coupled to energize a load circuit. A degaussing circuit that is used for degaussing the cathode ray tube (CRT) of a display monitor or of a television receiver is an example of such load circuit.

Color television receivers, for example, may experience magnetization of their metallic parts, including the picture tube shadow mask, by the earth's magnetic field or by external fields generated by electrical equipment, resulting in a change in the electron beam landing positions, thereby degrading the color quality in the reproduced picture. It is therefore common to provide a degaussing circuit for color television receivers or video display monitors that is operated each time the set is turned on. The degaussing circuit comprises a wire coil that is normally placed around the receiver picture tube in the vicinity of the shadow mask. In a typical circuit arrangement, when the receiver is initially turned on, current from the AC mains supply flows through the degaussing coil. A positive temperature coefficient thermistor, normally in series with the degaussing coil, increases in resistance as a result of heating by the degaussing current flow, thereby causing the degaussing current to decrease in magnitude until it is substantially zero. The diminishing AC degaussing current effectively demagnetizes the tube shadow mask and surrounding metallic components, restoring color purity and reproduced picture quality. The thermistor maintains its high resistance while the receiver is on and requires a finite period of receiver off time to cool in order to provide proper deguassing when the receiver is again turned on.

The degaussing circuit is generally designed to operate properly from a predetermined fixed amplitude of the AC mains supply by taking into account the required amplitude of the degaussing current and the allowable power dissipation in the degaussing coil.

It may be desirable to selectively adapt the degaussing circuit for proper operation with either one of predetermined dual AC mains supply voltages. The amplitude of one such AC mains supply voltage may be 220 volts RMS, such as used in a typical European country; whereas that of the other may be 110 volts RMS, such as used in the U.S.

It may be desirable to couple to the degaussing circuit an AC voltage of the same predetermined fixed amplitude to obtain a peak degaussing current of approximately the same amplitude so as to obviate the need for changing component values of the degaussing circuit when changing from one amplitude of the dual AC mains supply voltage to the other one.

In accordance with an aspect of the invention, when the lower amplitude AC mains supply voltage is provided, the entire AC mains supply voltage is selectively coupled to the degaussing circuit without substantial amplitude change. On the other hand, when the higher amplitude AC mains supply voltage is provided, a portion of the amplitude of the input AC mains supply voltage having an amplitude that approximates that of the lower one of the dual AC mains supply voltages is coupled to the degaussing circuit.

In accordance with another, general aspect of the invention, an AC input voltage is coupled to a rectifier arrangement of a voltage converter that develops DC voltages in first and second capacitors, respectively. The rectifier arrangement combines the AC input voltage, alternately, with the voltages in the first and second capacitors, respectively, to produce an output voltage that is coupled to energize a AC utilization circuit such as, for example, a degaussing circuit.

In an embodiment of the invention, used illustratively to energize a degaussing circuit, during the positive portion of each cycle of the AC input voltage, the rectifier arrangement couples to the degaussing circuit a positive difference voltage which is formed between the positive portion of the AC input voltage and the voltage in the first capacitor to produce a positive level of the deguassing voltage. Similarly, during the negative portion of each cycle of the AC input voltage, the rectifier couples only a negative difference voltage which is formed between the negative portion of the AC input voltage and the voltage in the second capacitor to produce a negative level of the deguassing voltage.

A feature of the invention is that the voltage converter, advantageously, dissipates low power while producing from the AC input voltage the degaussing voltage of a lower amplitude. Stepping-down the amplitude of the AC input voltage to obtain the degaussing voltage is accomplished by alternately coupling the voltages in the first and second capacitors in series with the AC input voltage to develop the respective positive and negative difference voltages that form the degaussing voltage. Note that power dissipation in the first and second capacitors is negligible. Thus, stepping-down the AC input voltage is performed with low internal power loss. Furthermore, stepping-down the AC input voltage is accomplished without using a tapped transformer or an attenuating impedance in series with the degaussing circuit.

In accordance with a further aspect of the invention, the converter selectively supplies to a second load circuit, from the voltages in the first and second capacitors, a DC supply voltage that is of the same level when either one of the dual AC mains supply voltages, respectively, is selectively coupled to the converter. Adapting the converter to operate at the corresponding AC mains line voltage is done, illustratively, by using a jumper wire. Thus, both the DC supply voltage and the degaussing voltage are generated using the same circuit components.

As described, the AC output voltage may be coupled to energize the degaussing circuit. However, it should be understood that other types of AC utilization circuits requiring a predetermined AC voltage amplitude for proper operation may be energized by the AC output voltage.

Figure 2:
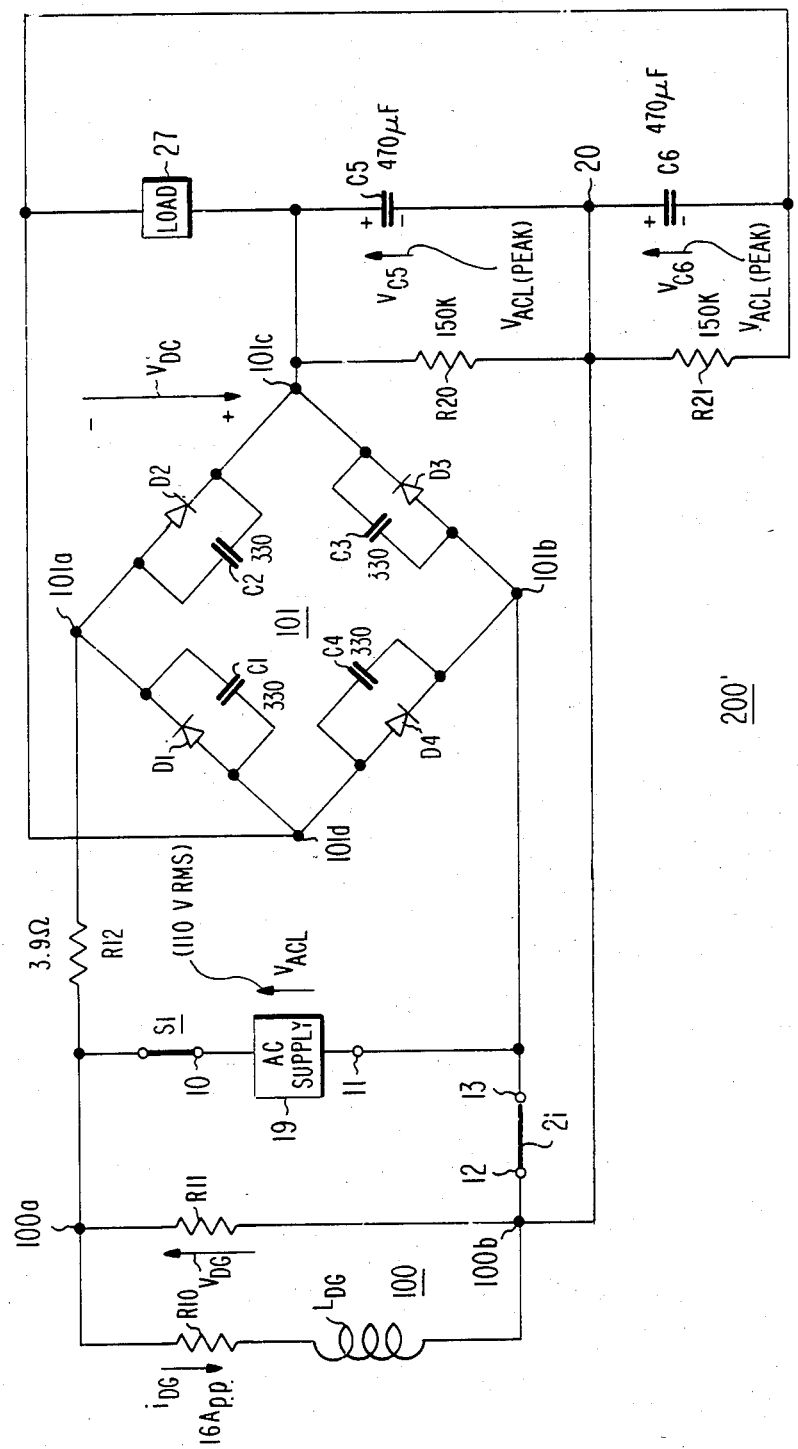
Figure 3:
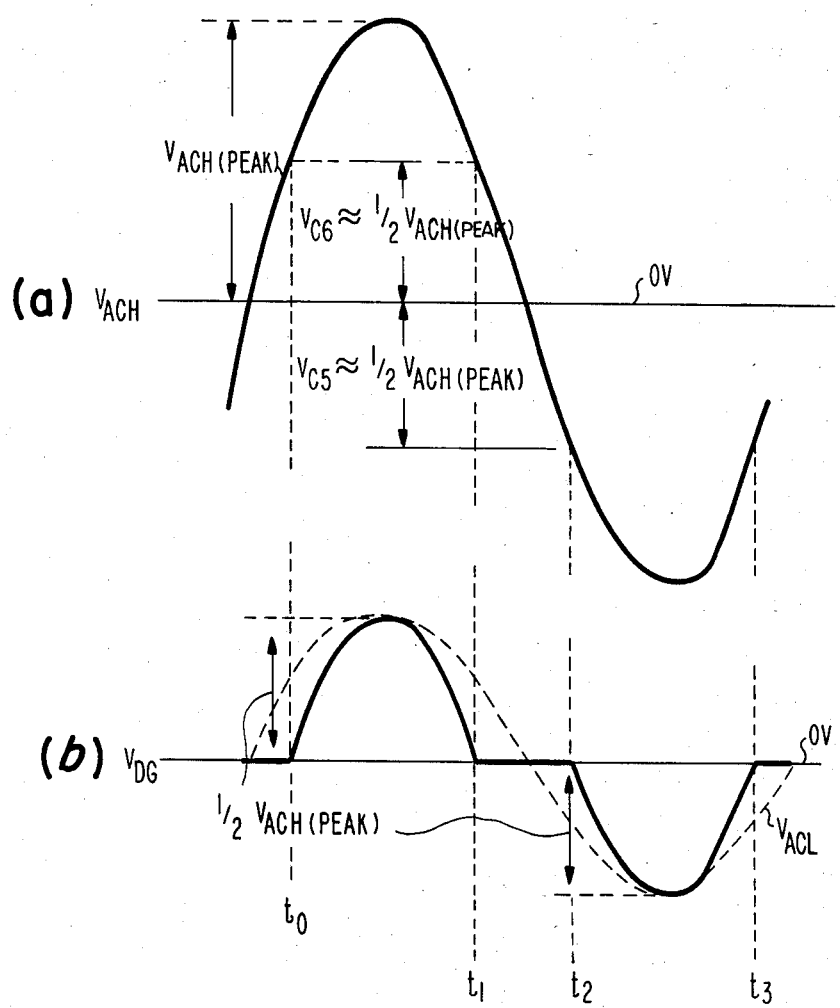

FIG. 1 illustrates a degaussing arrangement in which one-half of the amplitude of the AC mains supply voltage is coupled to a degaussing circuit;

FIG. 2 llustrates the arrangement of FIG. 1 as modified to couple the entire amplitude of the AC mains supply voltage to the degaussing circuit; and FIGS. 3a and 3b illustrate waveforms that are useful in explaining the operation of the arrangement of FIGS. 1 and 2.

Referring to FIG. 1, a terminal 10 of an AC mains supply 19 of a degaussing arrangement 200, is coupled through an on/off switch S1 in the "on" state and through a current limiting resistor R12 to a terminal 101a of a rectifier arrangement 101 comprising diodes D1 through D4. The other terminal of supply 19, terminal 11, is coupled to a terminal 101b of rectifier arrangement 101. An AC mains supply voltage $V_{ACH}$ of, illustratively, 220 volts RMS is developed between terminals 10 and 11 of AC mains supply 19. Terminal 101a is coupled between the anode electrode of diode D2 and the cathode electrode of diode D1. Terminal 101b is coupled between the anode electrode of diode D3 and the cathode electrode of diode D4. A terminal 101c is coupled between the cathode electrodes of diodes D2 and D3, and a terminal 101d is coupled between the anode electrodes of diodes D1 and D4. A series arrangement of capacitors C5 and C6 that are of, illustratively, equal capacitances is coupled between terminals 101c and 101d.

The series arrangement of capacitors C5 and C6 is used for developing a DC voltage $V_{DC}$ between terminals 101c and 101d by full-wave rectifying voltage $V_{ACH}$. In steady state operation, voltage $V_{DC}$ is equal, approximately, to the peak of voltage $V_{ACH}$ because the rectifiers in rectifier arrangement 101 operate as a conventionally built full-wave bridge rectifier. Note that each of capacitors C5 and C6 is charged to approximately one-half the peak voltage of voltage $V_{ACH}$. Voltage $V_{DC}$ is coupled across a load circuit 27 for supplying a load current $i_L$. Circuit 27 schematically represents circuitry within a television receiver or video display apparatus that is powered from AC mains 19 via rectifier arrangement 101.

A terminal 100a of a degaussing circuit 100 is coupled to terminal 10 of supply 19 through the wiper of switch S1. The other terminal of degaussing circuit 100, terminal 100b, is coupled to a junction terminal 20 that is coupled between the respective plates of capacitors C5 and C6.

Degaussing circuit 100 includes, between terminals 100a and 100b, a series arrangement of a thermistor R10 and a degaussing coil $L_{DG}$. Thermistor R10 has a positive temperature coefficient. The resistance of thermistor R10 increases as the temperature goes up, causing a corresponding progressive decrease of the amplitude of current $i_{DG}$ through degaussing coil $L_{DG}$, during the degaussing interval. Degaussing occurs, in a conventional manner, immediately following the time in which switch S1 is closed, provided that thermistor R10 is then cold. Degaussing circuit 100 also includes between terminals 100a and 100b a thermistor R11 that has a positive temperature coefficient. Thermistor R11 is thermally coupled to thermistor R10. Thermistor R11 is used for providing faster and extra heating of thermistor R10 during the degaussing interval so as to increase the resistance of thermistor R10 rapidly to a relatively high value.

In the cold state that occurs prior to the time switch S1 is turned on, each of thermistors R10 and R11, in the respective branches of degaussing circuit 100, has a relatively low resistance value. Immediately after switch S1 has been switched on, an AC voltage $V_{DG}$ as described later on, is developed between terminals 100a and 100b. Voltage $V_{DG}$ causes initially large currents to flow in both branches of circuit 100. The initially large currents in the respective branches that are caused by the initially low resistances of thermistors R10 and R11 are capable of heating thermistors R10 and R11 in a relatively short time of, illustratively, 10 seconds, following the switching-on time of switch S1. As thermistor R10 is getting hotter, its resistance becomes progressively higher and degaussing current $i_{DG}$ becomes, correspondingly, smaller. When current $i_{DG}$ becomes sufficiently small, the degaussing process substantially terminates.

In steady state operation, the sum of voltage $V_{C5}$ and $V_{C6}$ across capacitors C5 and C6, respectively, is approximately equal to the peak of voltage $V_{ACH}$, whereas the ratio $V_{C5}/V_{C6}$ is equal to the ratio between the capacitances of capacitors C6 and C5, respectively. Because the capacitances of capacitors C5 and C6 are equal, each of voltages $V_{C5}$ and $V_{C6}$ is approximately equal to $\frac{1}{2}V_{ACH(peak)}$, where $V_{ACH(peak)}$ is the peak voltage of voltage $V_{ACH}$.

Capacitor C5 and C6 are almost fully charged, at the latest, within one-half period of voltage $V_{ACH}$, following the switching-on time of switch S1. The relatively short charging time is due to the fact that the charging time constant associated with capacitors C5 and C6 is small relative to the half-period of voltage $V_{ACH}$.

FIG. 3a illustrates the sinusoidal waveform of voltage $V_{ACH}$ of FIG. 1. The solid-line waveform in FIG. 3b illustrates the waveform of degaussing voltage $V_{DG}$ developed in degaussing arrangement 200 of FIG. 1 immediately after each of capacitors C5 and C6 is charged to $\frac{1}{2}V_{ACH(peak)}$. Similar numbers and symbols in FIGS. 1, 3a and 3b represent similar items or functions. During the interval $t_0$–$t_1$ of FIG. 3a, the instantaneous positive value of voltage $V_{ACH}$ of FIG. 3a exceeds, in magnitude, voltage $V_{C6}$ that is equal to, approximately, $\frac{1}{2}V_{ACH(peak)}$. A resulting positive current $i_{100P}$ of FIG. 1 flows in the following current path: from terminal 10 of supply 19, through terminals 100a, through respective branches of degaussing circuit 100, through terminal 100b, through capacitor C6 that supplies DC voltage $V_{C6}$ that is of a relative polarity that subtract from voltage $V_{ACH}$ in the current path of current $i_{100P}$, then through terminal 101d of arrangement 101, through forward biased diode D4 and back to terminal 11 of supply 19. The portion of current $i_{100P}$ that flows in coil $L_{DG}$ comprises the degaussing current $i_{DG}$. It should be understood that if load current $i_L$, flowing in load circuit 27, is smaller than current $i_{100P}$, voltage $V_{C6}$ may exceed $\frac{1}{2}V_{ACH(peak)}$, during a portion of the degaussing interval.

Because diode D4 is forward biased, the instantaneous voltage $V_{DG}$ that is developed across degaussing circuit 100, between terminals 100a and 100b is a positive difference voltage approximately equal to $[V_{ACH}-\frac{1}{2}V_{ACH(peak)}]$. During the interval $t_0$–$t_1$ of FIG. 3b solid-line voltage waveform $V_{DG}$ follows the waveform of voltage $V_{ACH}$ of FIG. 3a but is level-shifted down by the magnitude $\frac{1}{2}V_{ACH(peak)}$.

Similarly, during the interval $t_2$–$t_3$ of FIG. 3a, the instantaneous negative value of voltage $V_{ACH}$ of FIG. 3a exceeds, in magnitude, voltage $V_{C5}$ that is approximately equal to $\frac{1}{2}V_{ACH(peak)}$. A resulting negative current $i_{100N}$ flows in the following current path: from terminal 11 of supply 19, through terminal 101b through forward biased diode D3, through terminal 101c, through capacitor C5 that supplies DC voltage $V_{C5}$, through terminal 20, through terminal 100b, through the respective branches of degaussing circuit 100, through terminal 100a and back to terminal 10 of supply 19. The portion of current $i_{100N}$ that flows in coil $L_{DG}$ comprises the degaussing current $i_{DG}$ that is of opposite polarity to that of current $i_{100P}$ that was described before. The instantaneous difference voltage $V_{DG}$ that generates the degaussing current $i_{DG}$ is negative during the interval $t_2$–$t_3$ and approximately equals $[V_{ACH}-\frac{1}{2}V_{ACH(peak)}]$, as illustrated in FIG. 3b. It should be understood that if load current $i_L$, flowing in load circuit 27, is smaller than current $i_{100N}$, voltage $V_{C5}$ may exceed $\frac{1}{2}V_{ACH(peak)}$ during a portion of the degaussing interval.

During the interval $t_1$–$t_2$, of FIGS. 3a and 3b, when the magnitude of voltage $V_{ACH}$ is less than $\frac{1}{2}V_{ACH(peak)}$, arrangement 101 isolates or floats degaussing circuit 100 from supply 19, thus causing degaussing voltage $V_{DG}$ to be zero.

FIG. 2 illustrates an arrangement 200' that is similar to arrangement 200 of FIG. 1, with the differences therebetween noted below. Similar numbers and symbols in FIGS. 1 and 2 indicate similar items or functions.

Arrangement 200' of FIG. 2 is obtained from arrangement 200 of FIG. 1 by coupling terminal 101b of bridge 101 of FIGS. 1 or 2 to terminal 100b of degaussing circuit 100, using for example a jumper wire or a switch 21 in FIG. 2 that is connected to terminals 12 and 13.

In arrangement 200' the amplitude of the voltage generated by AC mains supply 19, $V_{ACL}$, is, illustratively, equal to one-half that of voltage $V_{ACH}$ of FIG. 1. Illustratively, voltage $V_{ACL}$ of FIG. 2 has an RMS amplitude of, illustratively, 110 volts. Thus, $V_{ACL(peak)} = \frac{1}{2}V_{ACH(peak)}$, where $V_{ACL(peak)}$ equals the peak amplitude of voltage $V_{ACL}$.

In arrangement 200' voltage $V_{ACL}$ is coupled directly between terminals 100a and 100b of degaussing circuit 100. Therefore, the peak value of AC voltage $V_{DG}$ in arrangement 200 of FIG. 2, and illustrated by the dashed-line waveform of FIG. 3b, is also equal to $\frac{1}{2}V_{ACH(peak)}$, the same peak value developed in arrangement 200 of FIG. 1.

Thus, in accordance with yet another aspect of the invention, the amplitude of degaussing current $i_{DG}$ in coil $L_{DG}$ is approximately the same in both arrangements 200 and 200' of FIGS. 1 and 2, respectively. This is so, even though the amplitude of input voltage $V_{ACL}$ of FIG. 2 is one-half that of input voltage $V_{ACH}$ of FIG. 1.

In accordance with a further aspect of the invention, in both arrangement 200 and 200' of FIGS. 1 and 2, respectively, the DC voltage $V_{DC}$ that is developed between terminals 101c and 101d and that is coupled to load circuit 27 is the same. The level of voltage $V_{DC}$ is the same because, in FIG. 2, rectifier arrangement 101 is coupled to capacitors C5 and C6, in a well-known manner, as a voltage doubler of input voltage $V_{ACL}$, whereas, in FIG. 1, rectifier arrangement 101 is coupled to capacitors C5 and C6, also in a well-known manner, as a full-wave bridge rectifier of input voltage $V_{ACH}$.

What is claimed is:

1. A power supply for producng, from an AC input voltage, an AC output voltage, comprising;
    a source of said AC input voltage;
    first and second capacitors;
    a rectifier arrangement coupled to said source and to said first and second capacitors for rectifying said AC input voltage to develop DC voltages in said first and second capacitors, respectively; and
    a AC utilization circuit having a pair of terminals that requires, for proper operation, said AC output voltage having a predetermined amplitude to be developed between said pair of terminals, said AC utilization circuit being coupled to said AC input voltage through said rectifier arrangement such that said AC input voltage is alternately combined with said DC voltages in said first and second capacitors, in accordance with first and opposite polarities of said AC input voltage, respectively, for producing said AC output voltage at said predetermined amplitude that is developed between said pair of terminals of said AC utilization circuit.

2. A power supply as recited in claim 1 further comprising, coupling means cooperating with said source of AC input voltage, said AC utilization circuit and said rectifier arrangement and having first and second coupling positions for applying, in said first coupling position thereof, said AC output voltage to said AC utilization circuit when the amplitude of said AC input voltage is greater than said predetermined amplitude and for applying said AC input voltage to said AC utilization circuit in said second coupling position thereof when the amplitude of said AC input voltage is substantially that of said predetermined amplitude.

3. A power supply according to claim 2 wherein said coupling means comprises a jumper wire or a switch.

4. A power supply according to claim 2 wherein said first capacitor is coupled to said second capacitor in a series arrangement having a pair of end terminals and wherein, when said coupling means is in said second coupling position, said coupling means couples a junction terminal that is between the respective plates of said first and second capacitors to said rectifier arrangement for developing, between said pair of end terminals, a DC voltage that is approximately equal to twice the peak voltage of said AC input voltage.

5. A power supply according to claim 2 wherein said first capacitor is coupled to said second capacitor in a series arrangement having a pair of end terminals and wherein, when said coupling means is in said first coupling position, the voltage that is developed between said pair of end terminals of said series arrangement is approximately equal to the peak voltage of said AC input voltage.

6. A power supply according to claim 1 wherein, said rectifier arrangement produces a difference voltage that provides the positive portion of each period of the AC output voltage, when said AC input voltage is at said first polarity and the magnitude thereof exceeds the DC voltage in said first capacitor, and wherein said rectifier arrangement produces a negative difference voltage that provides the negative portion of each period of said AC output voltage, when said AC input voltage is at said opposite polarity and the magnitude thereof exceeds the DC voltage in said second capacitor.

7. A power supply as recited in claim 1 wherein said rectifier arrangment isolates said AC utilization circuit from said AC input voltage when the magnitude of said AC input voltage does not exceed the corresponding DC voltage in said first and second capacitor.

8. A power supply according to claim 1 wherein said first capacitor is coupled in series with said second capacitor to form a series arrangement having a pair of end terminals that are coupled to corresponding terminals of said rectifier arrangement and wherein said AC utilization circuit is coupled between a terminal of said source and a junction terminal of said first and second capacitors.

9. A power supply as recited in claim 8 wherein said rectifier arrangement comprises a bridge rectifier that operates as a full-wave rectifier.

10. A power supply as recited in claim 9 wherein said source is coupled between first and second input terminals of said bridge rectifier and wherein said pair of end terminals of said series arrangement is coupled between an output terminal and a current return terminal of said rectifier bridge.

11. A power supply as recited in claim 10 wherein said DC voltages in said first and second capacitors are approximately equal to one-half the peak voltage of said AC input voltage and wherein the amplitude of said AC output voltage is approximately equal to one-half that of said AC input voltage.

12. A power supply for producing, from an AC input voltage, an AC output voltage, comprising:
   a source of said AC input voltage;
   first and second capacitors;
   a rectifier arrangement coupled to said source and to said first and second capacitors for rectifying said AC input voltage to develop DC voltages in said first and second capacitors, respectively; and
   a degaussing circuit that requires an AC voltage having a predetermined amplitude for proper operation, said degaussing circuit being so coupled to said rectifier arrangement to enable said rectifier arrangement to alternately combine said AC input voltage with said DC voltages in said first and second capacitors, in accordance with first and opposite polarities of said AC input voltage, respectively, for applying said AC output voltage with said predetermined amplitude to said degaussing circuit.

13. A power supply as recited in claim 12 wherein said degaussing circuit comprises a first branch that includes a degaussing coil coupled in series with a first thermistor.

14. A power supply as recited in claim 13 wherein said degaussing circuit further comprises a second thermistor that is electrically coupled in parallel with said first branch and thermically coupled to said first thermistor.

15. A power supply as recited in claim 14 wherein said first and second voltages producing means comprises first and second capacitors that are, each, charged to one-half the peak voltage of said AC input voltage to provide said first and second voltages, respectively.

16. A power supply according to claim 15 further comprising coupling means having first and second coupling positions for selectively coupling, in said first coupling position thereof, said AC utilization circuit to said AC input voltage when said AC input voltage is greater than said predetermined amplitude and for selectively coupling in said second coupling position thereof said AC utilization circuit to said AC input voltage such that the entire amplitude of said AC input voltage is substantially developed across said AC utilization circuit.

17. A power supply according to claim 16 wherein said coupling means comprises a jumper wire or a switch.

18. A power supply for producing an AC output voltage of a predetermined amplitude, comprising:
   a source of an AC input voltage;
   means responsive to said AC input voltage for producing first and second voltages;
   a AC utilization circuit, having a pair of terminals, that requires energization by said AC output voltage at said predetermined amplitude for proper operation thereof; and
   means coupled to said first and second voltages producing means and responsive to said AC input voltages for producing said AC output voltage with said predetermined amplitude that is representative of the difference between said AC input voltage and said first voltage when said AC input voltage is of a first polarity and of a magnitude that exceeds that of said first voltage, and that is representative of the difference between said AC input voltage and said second voltage when said AC input voltage is of the opposite polarity and of a magnitude that exceeds that of said second voltage such that said AC output voltage that is developed between said pair of terminals is at a frequency that is related to the frequency of said AC input voltage.

19. A power supply for producing, from an AC input voltage, an AC output voltage for degaussing, comprising:
   a source of said AC input voltage;
   a bridge rectifier having a pair of input terminals that are coupled to said source and having an output terminal and a current return terminal;
   a series arrangement of first and second capacitors coupled between said output and current return terminals; and
   a degaussing circuit coupled between a terminal of said source and a junction terminal that is between said first and second capacitors of said series arrangement.

* * * * *